May 15, 1956  O. B. WOODWARD  2,745,292
LOCKING MECHANISM FOR VARIABLE SPEED DRIVES
Filed Sept. 11, 1952
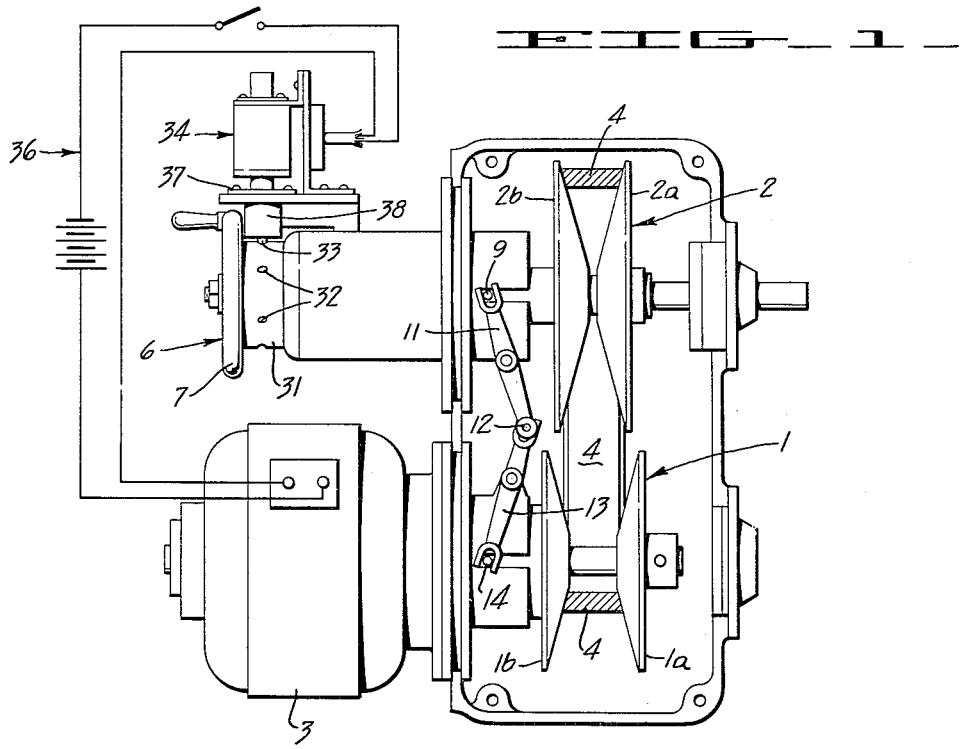
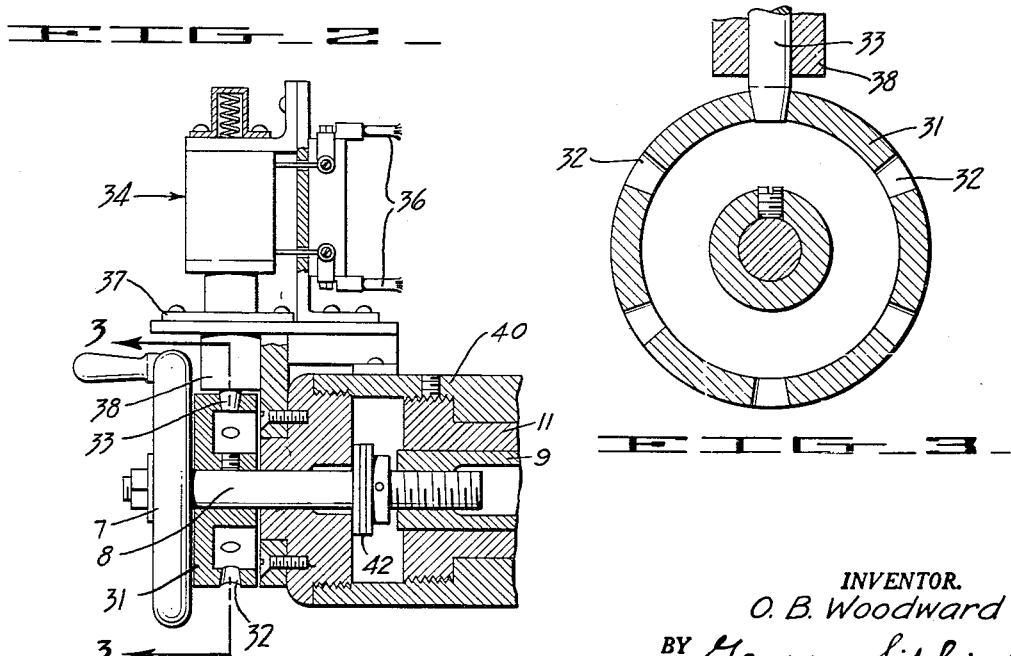
INVENTOR.
O. B. Woodward
BY George Sipkin
Paul U. Crutchlow Jr.
ATTORNEYS United States Patent Office 2,745,292
Patented May 15, 1956

2,745,292

LOCKING MECHANISM FOR VARIABLE SPEED DRIVES

O. B. Woodward, Vallejo, Calif.

Application September 11, 1952, Serial No. 309,156

5 Claims. (Cl. 74—230.17)

(Granted under Title 35, U. S. Code (1952), sec. 266)

This invention relates to variable speed drives, and, particularly, to apparatus for locking the adjusting mechanism of the drive.

This invention may be manufactured and used by or for the Government of the United States of America for governmental purposes without the payment of any royalties thereon or therefor.

It is necessary to provide variable speed drives for many different types of work and one common manner of accomplishing this is to mount a belt on a pair of adjustable sheaves which, when the speed of the drive is to be changed, are drawn together or spread apart so as to force the belt to assume a different position in which the drive speed is changed. In most cases, each of the sheaves is adjustable in that it is formed of separate halves one of which may be drawn toward or moved away from the other and the adjustment is made by contracting one of the sheaves and expanding the other so as to increase or decrease the belt radius of the sheave from which the drive is taken. However, in some drives only one of the sheaves is adjustable.

This type of drive has been found most satisfactory and variations are permitted with relative ease when the belt is being driven. However, it has been found that inexperienced, and sometimes skilled, operators attempt to change the position of the belt by adjusting the sheaves when the driving motor is shut off and, when such is attempted, it frequently has happened that the strain placed upon the parts of the apparatus is so great as to break or bend the weaker elements. When the belt is being driven, the adjustments do not impose any excess strain because the centrifugal force of the belt tends to draw the belt away from the sheave and to cause it to ride radially outwardly to the new and desired position. On the other hand, when the belt is not being driven, there is no centrifugal force to facilitate adjustments and the resulting strains frequently cause the described breakage.

Breakage is most troublesome in such variable speed units as have a pair of adjustable sheaves because these units must be provided with a linkage connecting both of the sheaves to a single manual control which permits simultaneous adjustments. Such linkage, most commonly, is of a bell crank type, the levers of which are coupled by wrist pins, or the like, and, as might be expected, any excess strains placed upon the links frequently are sufficient to break these pins as well as their elements. However, breakage or bending also occurs in those units in which there is but one adjustable sheave and no linkage, so that the problem is not limited to any particular type of drive.

The principal object of the invention is, therefore, to provide a simple, inexpensive and effective means for avoiding breakage in variable speed units by preventing operation of the manual sheave-adjusting control during such times as operation of that control would impose excess strains.

A more specific object is to provide a convenient means for locking the variable speed drive manual control when the driving power is "off," and for effecting an automatic unlocking or release of the manual control upon the initiation of the power supply.

According to the invention, a lock is provided for the conventional variable speed control mechanism, this lock including a reciprocable latch member fixedly carried in a position adjacent a latch keeper. The latch keeper, most suitably, is mounted on and is movable with the manual control so that when it is engaged by the latch, the control is locked in position. The lock is adapted for use with units that are electrically powered, and the latch, preferably, is a solenoid finger that is actuated upon the closing of a circuit that, in turn, is electrically connected with the motor circuit of the unit. Consequently, when the motor or power circuit is closed to drive the unit, the solenoid is energized and its finger withdrawn from its keeper to release the manual control for use. As has been described, there is little or no difficulty experienced with adjustments made while the driving motor and its driven parts are operating. The difficulty toward which the invention is directed arises when this motor is shut off and, during such a condition, the latch is so arranged that it is permitted to move into engagement with the latch keeper, such engagement locking the manual control and preventing its use.

The preferred embodiment of the invention is illustrated in the accompanying drawings of which Fig. 1 is a rather schematic illustration of one type of variable speed drive for which the lock of the invention is particularly suitable; Fig. 2 an enlarged side elevation of the lock shown in Fig. 1, and Fig. 3 a section taken along lines III—III of Fig. 2.

Referring to the drawings, the variable speed drive mechanism includes a pair of sheaves 1 and 2, sheave 1 being driven by motor 3 and, in turn, imparting its drive to sheave 2 by means of an endless flexible belt 4. As has been suggested, the desired speed variations are obtained by increasing or decreasing the effective radius of belt 4 about the hub of the driven sheave (sheave 2), and for this purpose both sheaves are formed of separate halves (1a, 1b, 2a, 2b) which, when drawn together or spread apart, cause the belt to move or shift between its full line and its dotted line positions of Fig. 1.

The sheave halves are drawn together or spread apart by the operation of manual adjustment control mechanism 6 which, as may be noted in Fig. 1, includes a rotatable wheel 7 secured to a shaft 8 and coupled to sheave half 2a in such a manner that rotation of the shaft causes this sheave to pull away from or draw toward the other. In addition, the sheave half movement produced by rotation of wheel 7, in turn, reciprocates a pin 9 which, as may be seen, is engaged by the forked end of a centrally pivoted link arm 11. Link arm 11 is provided to translate the adjusting movement of wheel 7 to the other pair of sheave halves 1a and 1b and, to accomplish this purpose, link 11 is connected by means of a floating pin 12 to a lower link arm 13 which also has a lower forked end adapted to engage another reciprocating pin 14. Functionally described, reciprocation of pin 14 is translated through suitable couplings to sheave half 1b, the net result being that rotation of wheel 7 produces an axial adjustment in the spacing of sheave half 2a, while this effected adjustment, in turn, is transmitted to sheave half 1b to accomplish a coordinated compensatory axial adjustment in the sheave halves 1a and 1b. The arrangement is such that any drawing together of sheave halves 2a, 2b produces a related spreading apart of sheave halves 1a, 1b and, when this particular adjustment is made, belt 4 is forced to assume the position shown in Fig. 1 in which, as will be apparent, the output rotational speed produced by the drive of motor 3 will be reduced to a minimum because the radial distance of belt 4 from the axis of sheave 2 is increased to a maximum. Conversely, increased rotational speeds may be produced by so adjusting the sheaves as to decrease the radial spacing of belt 4 from the axial of sheave 2.

The particular driving connections permitting the axial adjustments of sheave halves 2a and 1b are not shown in detail because this mechanism is quite well known in the art and it can be accomplished in a number of conventional ways, such, for example, as in the manner illustrated in detail in U. S. Patent 2,207,219 issued to D. Heyer, July 9, 1940.

A conventional thrust type ball bearing 42 is secured to the shaft 8, as shown in Fig. 2, to prevent the shaft 8 from moving axially when the wheel 7 is operated to adjust the position of the sheave halves 2a and 1b.

Although the above-described mechanism has been used successfully considerable difficulty has been experienced with it because operators are prone to attempt to make the necessary adjustments when the belt is not being driven. When such attempts are made, the resistance of the belt to movement is so great that frequently pins 9 or 14 or the link arms themselves break or are so bent as to become ineffective. The adjustments can be made with ease when belt 4 is being driven because of the centrifugal force created causes the belt to ride into any new desired position.

For these reasons, the principal feature of the present invention resides in mechanism for preventing sheave adjustments during such times as the belt is not being driven. The mechanism includes fundamentally a latch keeper member 31 provided with a series of radially spaced apertures 32 adapted to receive a latching arm 33. Latch keeper 31 is splined or rigidly secured to shaft 8 of wheel 7 so that, when the keeper is engaged by latch arm 33, the wheel cannot be turned.

Functionally, the arrangement is such that the latch engages its keeper when the belt is not being driven and this is accomplished by so mounting the latch that it will drop or move into one or the other of radially spaced recesses 32 when motor 3 is not energized. However, when motor 3 is energized, the latch is raised upwardly to release latch keeper 31 and wheel 7 and, consequently, to permit sheave adjustments. In other words, the object of the latch arrangement is to lock wheel 7 when the motor is "off" and permit adjustments when the motor is turned on. For this purpose, latch 33 forms the plunger arm of a solenoid coil 34, this coil being connected into power circuit 36 which energizes the motor. The coil, most suitably, is supported on a bracket 37 which, in turn, is bolted to casing 40 of the control mechanism and, as best seen in Fig. 2, bracket 37 also mounts a guide plate 38 to assure vertical reciprocations of solenoid latch arm 33. However, as may be appreciated, it is not essential that latch arm 33 fall vertically into engagement with latch keeper 31 since, if desired, a suitable resilient force could be provided to urge the latch into engagement from a lateral position.

The operation of the present locking mechanism should be clearly apparent from the above description. The solenoid acts to lift the plunger when motor 3 is driving the belt and the lifting of this plunger releases control wheel 7 and permits the sheave adjustments described. When the motor is shut off, deenergization of solenoid 34 permits latch arm 33 to drop into engagement with the latch keeper to effectively prevent manipulations of wheel 7. The obvious advantage of this arrangement, apart from its simplicity and economy, is the fact that it successfully resists any attempts to adjust the sheaves when the motor is shut off and, as a result, it prevents breakage or other injury to the drive mechanism which, otherwise, would occur if adjustments were attempted at that time.

Obviously many modifications and variations of the present invention are possible in the light of the above teachings. It is, therefore, to be understood that within the scope of the appended claims the invention may be practiced otherwise than as specifically described.

I claim:

1. In a variable speed belt drive powered by an electrical power circuit and having a control mechanism for varying the drive speed, the combination with said control mechanism of a lock comprising a latch keeper fixed to the control mechanism so as to move therewith, an electrically actuated latch mounted adjacent said keeper which engages said keeper to lock the same and thereby the control mechanism against movement when said power circuit is deenergized, and electrically operated means in circuit with said power circuit for disengaging said latch and thereby free it and said control mechanism for movement upon energization of said power circuit.

2. Apparatus in accordance with claim 1, wherein the electrically operated means is a solenoid having a plunger forming the latch whereby the latch is disengaged from the latch keeper when the power circuit is energized.

3. In an apparatus of the character described having an electrically-energized belt drive and an electrical power circuit for said drive, the combination comprising a control mechanism for adjusting the speed of said drive and including an adjustable belt sheave and a shaft for adjusting the sheave, a latch keeper fixed to said shaft for movement therewith, a latch mounted adjacent said keeper which engages the keeper to lock the same and thereby the control mechanism against movement when said power circuit is deenergized, and electrically operated means in circuit with said power circuit for disengaging said latch from the latch keeper and thereby freeing the keeper and said control mechanism for movement when the said power circuit is energized.

4. In a variable ratio transmission, a pair of sheave structures, a belt engaging said structures, an electric motor driving one of said structures, an electrical power circuit for supplying power to said motor, one of said sheaves being split so the flanges may be moved toward and away from each other to vary the effective diameter, a movable control shaft for moving one of said split sheave flanges to vary the effective diameter, a latch keeper mounted on said shaft to move therewith and provided with a plurality of spaced recesses, a latch mounted adjacent said keeper in position to engage one of said recesses and lock the keeper and control shaft from movement, electrically operated means in circuit with said power circuit for withdrawing said latch from engagement with said recesses and unlocking the keeper and control shaft for movement whereby the control shaft is locked when the power circuit is deenergized and unlocked when the power circuit is energized.

5. Apparatus in accordance with claim 4 wherein the electrically operated means is a solenoid having a plunger forming said latch.

References Cited in the file of this patent
UNITED STATES PATENTS

| | | |
|---|---|---|
| 2,207,219 | Heyer | July 9, 1940 |
| 2,259,567 | Johnson | Oct. 21, 1941 |